United States Patent
Ruf

(10) Patent No.: US 12,242,917 B2
(45) Date of Patent: Mar. 4, 2025

(54) READING AN OPTICAL CODE

(71) Applicant: SICK AG, Waldkirch (DE)

(72) Inventor: Hannes Ruf, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/584,223

(22) Filed: Feb. 22, 2024

(65) Prior Publication Data

US 2024/0289573 A1   Aug. 29, 2024

(30) Foreign Application Priority Data

Feb. 24, 2023 (EP) .................................... 23158471

(51) Int. Cl.
  *G06K 7/10* (2006.01)
  *G06T 3/40* (2006.01)
  *G06T 7/194* (2017.01)

(52) U.S. Cl.
  CPC ............ *G06K 7/10762* (2013.01); *G06T 3/40* (2013.01); *G06T 7/194* (2017.01); *G06T 2207/10024* (2013.01)

(58) Field of Classification Search
  CPC ........... G06K 7/10762; G06K 7/10435; G06K 7/10445; G06K 7/12; G06K 7/14; G06K 7/146; G06K 7/10722; G06K 7/10841; G06K 7/1439; G06T 3/40; G06T 7/194; G06T 2207/10024
  See application file for complete search history.

(56) References Cited

U.S. PATENT DOCUMENTS

| 2007/0268530 | A1  | 11/2007 | Gagliano et al. |
| 2009/0121027 | A1* | 5/2009  | Nadabar ........... G06K 7/14 235/470 |
| 2016/0188936 | A1* | 6/2016  | Nunnink ......... H04N 23/00 235/462.22 |

(Continued)

FOREIGN PATENT DOCUMENTS

| DE | 202021105663 U1 | 3/2023 |
| EP | 1365577 A1 | 11/2003 |

(Continued)

OTHER PUBLICATIONS

European Search Report dated Aug. 10, 2023 corresponding to application No. 23158471.5-1205.

*Primary Examiner* — Tuyen K Vo
(74) *Attorney, Agent, or Firm* — Nath, Goldberg & Meyer; Jerald L. Meyer

(57) ABSTRACT

A camera based code reader for reading an optical code on an object in a relative movement to the code reader has a linear image sensor to record a respective image line and a control and evaluation unit having at least one first pre-processing unit and a further processing unit. The first pre-processing unit is connected to the image sensor and is configured to read image line by image line in the course of the relative movement, to rescale a respective image line with a zoom factor z in a pre-processing, and then to forward it to the further processing unit. The further processing unit is configured to read the optical code from the image lines. The image sensor has a plurality of linear arrangements of light reception elements. Some of the light reception elements are sensitive to white light and some are respectively sensitive to only one color.

18 Claims, 4 Drawing Sheets

(56) References Cited

U.S. PATENT DOCUMENTS

Figure 1:
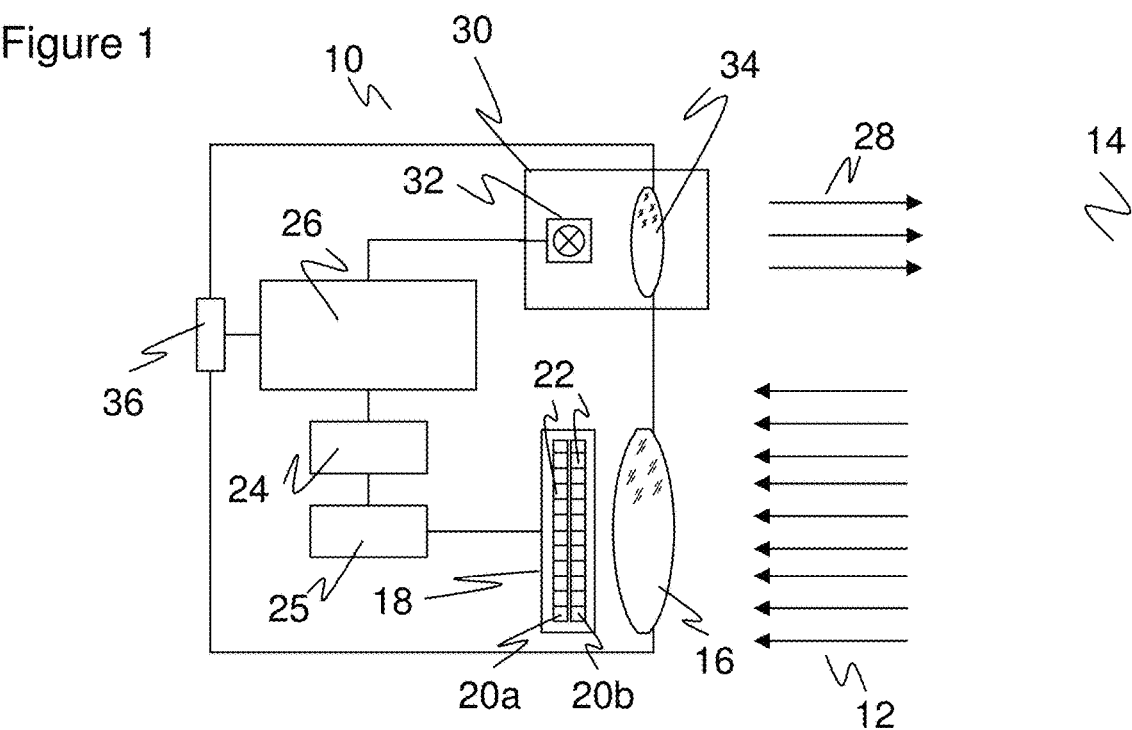

2018/0068139 A1* 3/2018 Aalund ................ G06K 7/1413
2021/0117634 A1* 4/2021 M?ller ............... G06K 7/10851
2024/0125905 A1* 4/2024 Cilli .................... G06K 7/1439

FOREIGN PATENT DOCUMENTS

| EP | 2003599 | A1 | 12/2008 | | |
|----|---------|----|---------|---|---|
| EP | 2026249 | A1 | 2/2009 | | |
| EP | 3916633 | A1 | 12/2021 | | |
| EP | 3822844 | B1 | 3/2022 | | |
| EP | 4080402 | A1 | 10/2022 | | |
| WO | WO-03044586 | A1 * | 5/2003 | ........... | G06K 7/1404 |

* cited by examiner $o1 = (\quad 0 \quad + (a * i1)) * b$
$o2 = ((1- a) * i1 + (a_1 * i2)) * b \qquad | \ a_1 = (a + a) -1 = 0{,}5$
$o3 = ((1- a_1) * i2 + (a_2 * i3)) * b \qquad | \ a_2 = (a_1 + a) -1 = 0{,}25$
$o4 = ((1- a_2) * i3 + (a_3 * i4)) * b \qquad | \ a_3 = (a_2 + a) -1 \leq 1 \rightarrow a_3 = 0$ $o5 = (\quad 0 \quad + (a * i4)) * b$ o1 = (( 1 − (0*a) )*i1 + ((1*a) * i2))) * b
o2 = (( 1 − (1*a) )*i2 + ((2*a) * i3))) * b
o3 = (( 1 − (2*a) )*i3 + ((3*a) * i4))) * b o4 = (( 1 − (0*a) )*i5 + ((1*a) * i6))) * b
...

READING AN OPTICAL CODE

The invention relates to a camera based code reader for reading an optical code on an object in a relative movement to the code reader and to a method of reading an optical code on an object using a camera based code reader.

For the automation of logistics applications, for example the automatic sorting of objects, objects are provided with a code that is read by a code reader. The optical codes used are barcodes or two-dimensional codes such as a matrix code or an Aztec code, in a somewhat further sense also legends that are decoded by optical character recognition (OCR). To read such codes, images of the objects with the codes are recorded.

In an automatically working reading device, for instance in baggage handling at airports or in the automated sorting of parcels in logistics centers, the objects are conveyed past the code reader and image data of the objects with the codes arranged thereon are acquired by linewise scanning. The individual image lines are assembled using the known or the measured belt speed. Line scan cameras achieve a high resolution and speed.

The line scan cameras typically record a monochrome image that is also called a grayscale image or a black and white image. The best photon yield and therefore the best signal-to-noise ratio is thus achieved and color detection initially appears to be of no interest for the reading of codes that anyway only have light and dark areas. If color information should nevertheless be acquired, matrix cameras are made use of as a rule. However, this particularly has disadvantages with fast belt applications since a high frame rate is required and the stitching of its individual frames is very processor intensive in contrast to a simple arrangement of image lines next to one another. In addition, a matrix image sensor cannot reach the same number of pixels in the linear direction as a linear image sensor. Color line scan cameras are also known, but less widespread. They have, for example, three lines in red, green, and blue (RGB), an alternating arrangement of these primary colors on a single line, or in imitation of the Bayer pattern, a line having alternating red and blue pixels and a second, purely green line. The Bayer pattern and equally the representation of the color space by RGB are frequently used, but do not represent the only options. Alternative color patterns add a white channel (RGBW), for example, or use subtractive primary colors (CMY, cyan, magenta, yellow, optionally as CMYK with a key (black) portion). There are further representations of the color space such as HSV (hue, saturation, value) or LAB or CIELAB.

EP 3 822 844 B1 discloses a line scan camera having at least one white line for recording a grayscale image and at least one color line for recording a color image. Red and blue light reception pixels are provided in the color line here, while there are no green light reception pixels. The green color information can be reconstructed from the red and blue image information with the aid of the white line.

EP 4 080 402 A1 deals with a brightness and color correction of image data that are recorded using a line scan camera in the form of a grayscale image and at least two single-color images. A brightness function is determined individually for a respective illumination module of a line scan camera and is then stored. The line scan camera reads this brightness function and uses it to correct the grayscale image and the single-color image.

The images to be processed are becoming larger and larger thanks to the continuing development in camera and image sensor technology. The huge amounts of data present the limited processing capacities and bandwidths for forwarding to and processing in a camera under real time conditions with challenges. In this respect, the use of heterogeneous processing architectures assists, i.e. a combination of a microprocessor (central processing unit, CPU) having, for example, an FPGA (field programmable gate array), a DSP (digital signal processor), a GPU (graphics processing unit), or a so-called AI accelerator (neural processing unit, NPU, tensor processing unit TPU).

The combination with an FPGA that is responsible for the reading of the image data from the image sensor has particularly proven itself here. The FPGA is additionally connected to a memory of the microprocessor via a high speed interface (peripheral component interconnect, PCI, PCI express, PCIE, mobile industry processor interface, MIPI). The image data are thus transmitted into the memory by the FPGA via DMA (direct memory access). This process of reading and saving is called streaming. The decoder implemented by means of a CPU can then access the stored images and read the codes downstream. The streaming approach is not easily possible using all the above-named additional modules of a heterogeneous architecture provided that they themselves already require a stored image while the FPGA can read and further process image data directly pixel-wise.

The image data are preferably already pre-processed directly on the fly in the FPGA and in this respect additional information or metadata can be saved for the microprocessor with the image data. Typical pre-processing steps relate to the segmentation in which regions of interest (ROIs) having code candidates are located or to a brightness adaptation. EP 2 003 599 A1 describes discloses an optoelectronic sensor and a method for the detection of codes in which a binarizer is already configured for a conversion of a color image or a grayscale image into a binary image during the reception and/or in real time in that a respective read section is binarized even while the further sections are read. EP 1 365 577 A1 describes a method of operating an optoelectronic sensor in which an image is already compressed during the reception. The capability of the FPGA is respectively used in such pre-processing steps to carry out a number of simple processing operations such as matrix multiplications in parallel in real time. Sequential, more complex processing operations such as those of a decoder for reading optical codes are reserved for the microprocessor that makes use of the provided image data and possible pre-processing results for this purpose.

A camera and a method for processing image data are described in EP 3 916 633 A1 in which method a segmentation takes place by means of a neural network in a streaming process, i.e. image data are already processed while further image data are still being read. At least the first layers of the neural network can be implemented on an FPGA. This substantially reduces the computing times and the demands on the hardware. In some embodiments, the original image in accordance with possible classical pre-processing steps is streamed to a memory in addition to the results of the neural network.

A further known pre-processing step relates to a zoom or to a resolution adaptation. This is called a digital zoom as a delineation from an optical zoom in which lenses of a zoom objective are moved or varied. The image lines recorded by a line scan camera are here brought to a new resolution determined by a zoom factor by calculation by interpolation or extrapolation. This is described, for example, in US 2007/0268530 A1.

EP 2 026 249 A1 feels the need for the geometry of the objects for the recording of rectified images having a uniform resolution and suitably sets a zoom factor and a recording frequency for the respective line to be scanned, in particular in the form of zoom ramps and frequency ramps that follow an object surface oriented obliquely to the line sensor. This zoom factor is, however, not taken into account digitally by calculations, but is rather set optically.

The conventional digital zoom only relates to grayscale images. In a color line scan camera, the additional problem arises that the grayscale image and the color image have to remain synchronous with one another despite the possibility of different zoom factors for every line. The data quantities to be processed again become substantially larger here due to the additional color image data and the camera has to reach the required processing speed. With conventional approaches, this asks too much of the hardware resources of a camera that can no longer perform the processing, including the digital zoom, in real time in view of the fast band speeds, the high resolutions, and the demand for small dynamic power loss.

It is therefore the object of the invention to further improve code reading with a line scan camera.

This object is satisfied by to a camera based code reader for reading an optical code on an object in a relative movement to the code reader and by a method of reading an optical code on an object using a camera based code reader in accordance with the respective independent claim. Optical codes are in particular barcodes and two-dimensional codes of any desired standard. The relative movement between the objects to be recorded and the code reader is preferably produced in that the code reader is installed as stationary at an object stream, for example at a conveying device. The linear image sensor or line sensor respectively records an image line and thus the corresponding linear section of the object that is in the current position of the relative movement in the field of view of the image sensor. An internal, external, or partially internal and partially external control and evaluation unit of the camera has at least one first pre-processing unit and a further processing unit. The first pre-processing unit is connected at least indirectly to the image sensor. It reads image line by image line and forwards them in pre-processed form to the further processing unit, with this being able to mean that the pre-processed image lines are written to a memory to which the further processing unit likewise has access. A pipeline structure is thus produced in which the first pre-processing unit is responsible for the streaming of the image data or at least participates therein, i.e. the successive reading and forwarding of image data in an image data stream. The image lines that are strung together produce an image that is in principle an endless image or can be combined to form an image having a randomly fixed number of image lines, preferably dependent on the content as one image per object or region of interest such as a label or a code region.

The pre-processing step of the first pre-processing unit looked at here is a zoom with which the respective image line is rescaled with a zoom factor of z. A new image line is therefore formed in which the n pixels are stretched or compressed to n×z pixels. Zoom factors z>1 corresponding to a stretching and z<1 corresponding to a compression are possible here. The zoom factor is here preferably respectively selected from image line to image line such that the image lines record objects at the same scale, i.e. object structures of the same extent are recorded with the same number of pixels. One possibility of expressing this is a fixed resolution in dpi (dots per inch, here rather pixels per inch). The zoom factor z=1 can occasionally occur in special situations in which the target resolution of an image line is reached from the start arbitrarily due to the object and its distance. This does not change the fact that the camera is equally configured for different zoom factors and preferably also carries out the calculations for the zooming at z=1 instead of separately intercepting this special case, which is naturally also possible. There can be further pre-processing steps beside the zoom, for which some examples have been named in the introduction.

The further processing unit reads the optical code from the pre-processed image lines. It can remain restricted to regions of interest in which codes are actually present in accordance with a segmentation as a further pre-processing step.

The invention starts from the basic idea of using a color line sensor and of carrying out the zoom in parallel channels for the respective colors. The image sensor is accordingly configured as a line sensor having a plurality of linear arrangements of light reception elements or light reception pixels. A plurality of linear arrangements means a small number, at least smaller than ten; the resolution in the linear direction and thus the number of light reception elements in the linear direction is orders of magnitude higher and amounts to several hundreds, thousands, or more. Each of the light reception elements is respectively responsible for the recording of grayscales or a specific color. There are therefore light reception elements that can be called color reception light elements and that only perceive one color, are provided, for example with a color filter. They form a plurality of color channels in which respective color image lines of the associated color are recorded. Other light reception elements that can be called white light reception elements perceive the whole optical spectrum and in particular do not have any color filter. They form a grayscale channel in which grayscale image lines or black and white image lines are recorded. The hardware imitations of the image sensor naturally form a limit of the perceived light. The white and color pixels can be distributed over the linear arrangements in different patterns.

The first processing unit has a plurality of parallel processing channels, namely at least one processing channel for the grayscale channel and at least one respective processing channel for every color channel. The zooming is thus parallelized for the different colors and the grayscales or a respective image line that has a grayscale image line and a plurality of color image lines are synchronously rescaled in parallel. The association of a grayscale image line and color image lines with one another is produced in that they correspond to a recording of the image sensor or to the same section of the recorded scene. The same or an individual zoom factor z can be used in the processing channels.

The invention has the advantage that the problems described in the introduction of the large data quantity and the synchronicity of the image data for color recordings and even a simultaneous grayscale recording is solved. The required processing speed can be reached and the dynamic power loss can be reduced by the parallel processing channels. The problem would otherwise not be able to be solved on hardware integrated in a camera or at least only at disproportionate cost. The zooming is possible in real time thanks to the invention and can be integrated in a pipeline structure with on the fly processing during the streaming. On the fly means that one image line is rescaled while the next image line is already recorded or read. No noticeable additional processing time is thus effectively required for the zoom except for a small time offset for a single-time running through of one of the parallel processing channels. As soon as the image data for a downstream image processing or a code reading of the further processing unit are available at all, they are also already rescaled by the zoom factor.

The code reader preferably has a distance sensor, with the control and evaluation unit being configured to determine the zoom factor z from a distance value of the distance sensor, in particular image line by image line. The distance sensor can be integrated in the code reader or can be external, for example a laser scanner arranged upstream against the relative movement. The matching zoom factor z can be associated with the measured distance via a geometrical calculation or also via a prepared lookup table, in particular a new zoom factor z line by line. In the case of an object surface disposed obliquely to the code reader, a new distance value does not necessarily have to be measured for every line and nor does a zoom factor z have to be calculated therefor; zoom ramps can rather be moved through in which the zoom factor follows the slant, as described in EP 2 026 249 A1 named in the introduction. The first pre-processing unit, for example, receives a distance value from the further processing unit and determines the zoom factor z from it itself or the zoom factor z is transferred directly from the further processing unit to the first pre-processing unit. For the control of the distance sensor and/or for the determination of a zoom factor, the control and evaluation unit can have a further unit that performs said functionality alone or together with a further processing unit.

The zoom factor z preferably differs in the processing channels. A pixel pattern of the image sensor is thus preferably compensated, for example, in which the light reception elements sensitive to grayscales and to a respective color are disposed with different densities so that the resolution in the grayscale channels and in the color channels is different. The difference can occur between the grayscale channel and color channels that are the same per se, but also within the color channels.

The control and evaluation unit is preferably configured to divide image lines in the middle in each case and to mirror one of the half lines produced, with the processing channels being configured to rescale both half lines of an image line in parallel. The first pre-processing unit or an upstream second pre-processing unit still to be presented is responsible for this, preferably within the control and evaluation unit. An even faster processing and/or an even lower performance capability of the calculation modules used or a lower cycle frequency are possible due to the halving of the image line or the effective doubling of the processing channels. The separation in the middle and the mirroring provide a homogeneous zoom and a smooth transition if the one rescaled half line is subsequently reflected back again and is combined with the other rescaled half line.

The processing channels are preferably configured to rescale an image line by linear interpolation or extrapolation with the zoom factor z, in particular in that the recorded image line is stretched or compressed by the zoom factor z and the stretched or compressed image line is discretized to the original pixel grid again, with the stretched or compressed pixels contributing to the new pixel in proportion with their surface portion overlapping the new pixel at transitions of the pixel grid. Zooming is consequently a linear operation. The calculation is naturally practically given by equations, but this can be thought of as the image line stretched or compressed by the zoom factor z being placed next to a pixel line having the original widths. A new pixel value that results from the stretched or compressed contacting pixels should now be associated with a pixel in the pixel line having the original widths, that is called a new pixel, selected by way of example. As long as $0.5 \leq z \leq 2$ applies, which is sufficient as a rule for practical purposes, there can only be two such contacting pixels per new pixel and they contribute proportionally to their overlapping surface portion. If therefore the transition of the contacting pixels is central to the observed pixel, the contacting pixels contribute at 50%, with correspondingly linearly changed weighting to the extent the transition is displaced to the right or to the left. The procedure can be very simply extended to the case without the restriction $0.5 \leq z \leq 2$, there can then be more contacting pixels that partially overlap in full and that contribute with a correspondingly high weight. At a zoom of $z > 1$, the stretched image line at the margins are preferably ignored or cut off; correspondingly, at a zoom of $z < 1$, pixels up to the outer margins having a fixed value such as zero are filled up so that the rescaled image line always remains the same length at the end independently of the zoom factor z.

The first pre-processing unit preferably has a common zoom control for all the processing channels. This secures the synchronicity and a zoom factor z that is suitable everywhere in a simple manner.

The first pre-processing unit preferably has an FPGA (field programmable gate array) and/or the further processing unit has/have a microprocessor. As already mentioned in the introduction, this hybrid architecture has proven itself with camera based code readers in which the FPGA is responsible for those processing steps that are not particularly complex per se, but are to be applied to large data quantities. The microprocessor then takes care of downstream processing steps, in particular the code reading, and indeed preferably only in regions or interest or otherwise preselected and thereby reduced data quantities.

The control and evaluation unit preferably has a second pre-processing unit, in particular an FPGA, that is arranged between the image sensor and the first pre-processing unit and that is configured to carry out a color adaptation of the image lines recorded with the color channels and/or to generate at least one further color channel from the grayscale channel and the color channels. Each picture element can be understood as a vector with a plurality of color components, with a grayscale being one of the color components or not depending on the embodiment. Color adaptation or color matching means that respective new, adapted color components that correspond to desired colors and compensate for color falsification are assigned to the picture elements. This can be understood in abstract terms as a generally nonlinear function from a color space into a color space. The function typically remains in the same color space, but without precluding a change, for example with an image recording in RGB and adapted colors in CYMK. The function can, for example, be implemented in the form of weighting by which the grayscale channel or the color channels contribute to the color adapted picture element as a lookup table or preferably as a neural network. The color adaptation can also generate a further color channel or reconstruct a color. The grayscale channel in particular records a superposition of all the primary colors so that one primary color can be isolated when the other primary colors are recorded. The image sensor, for example, has only white, red, and blue light reception elements, but no green ones. There is then originally no green channel, but it can be reconstructed from the color channels present. The reconstruction can follow a color adaptation; or, particularly preferably, the reconstruction and the color adaptation take place in one step.

A grayscale image from image lines of the grayscale channel is preferably used to read codes and/or a color image from image lines of the color channels is used to recognize and to classify code bearing objects and/or code regions and/or to distinguish them from the image background. It is possible in principle to read optical codes from a color image. The best possible signal-to-noise ratio and, depending on the design of the image sensor, also the highest resolution result in the grayscale image, however, so that code reading is possible with the same quality as with a conventional monochrome image. The color information can be used for any desired functions, but also for functions associated with the code reading, for example an initial segmentation or localization of code regions. The substrate of the code frequently differs in color from the environment or the color information can be used to recognize a code bearing object and to separate it from the background. Alternatively, the color image is used for some other function, is in particular output as such and only used subsequently, either for visualization and diagnostic functions or completely different additional work. The two functions of recording a grayscale image particularly suitable for code reading and of recording a color image usable for support purposes or other purposes can be combined with one another, in particular in one unit.

Two, three, or four linear arrangements are preferably provided and at least one linear arrangement only has light reception elements that are sensitive to white light. Said numbers are here exact indications, not minimum indications. A particularly compact design of the image sensor is achieved with a few linear arrangements. One example is a double line having one line for grayscale image data and one line for color image data. Since a plurality of colors have to share a single line for color image data, at least two lines are preferably provided for the recording of color image data to increase the resolution in the linear direction.

The image sensor preferably has light reception elements that are respectively sensitive to two primary colors, in particular red and blue, but have no light reception elements that are sensitive to the third primary color, in particular green. Primary colors are the additive primary colors red, green, and blue or the subtractive primary colors cyan, magenta, and yellow. In that only two thereof are provided, light reception elements and linear arrangements are saved. The missing primary color can be reconstructed as required as described above. It would alternatively be conceivable that all three respective primary colors are present (RGB and CMY or RGBW, CMYW). The present primary color components or recorded primary colors are preferably red and blue. The recording of additive primary colors produces particularly good results, but this does not mean that the reconstruction of a missing color component is restricted to this color representation. Particularly the green provided twice in the Bayer pattern is not recorded in this preferred embodiment so that no light reception elements of the image sensor have to be provided for this purpose. If required, green is generated from the white, red, and blue color components.

The color light reception elements within a line for the recording of color image lines are preferably sensitive to the same color. In other words, such a line is uniform, for example a red line, a green line or a blue line. The corresponding color information is thus detected in full resolution. Alternatively, the light reception elements within a line can also be sensitive to different colors, in particular in an alternating order such as red-blue-red-blue or red-green-green-blue. It is furthermore conceivable to combine uniform lines and mixed lines with one another, for instance one line with red-blue-red-blue and one entirely green line. In principle, even white and color light reception elements can occur mixed in the same line, but white light reception elements preferably form whole, entirely white lines since otherwise relevant resolution losses and at least avoidable complexities result for the code reading.

The grayscale image lines are preferably recorded in a higher resolution than the color image lines. This is advantageous in cases in which the color is only required as support when the code reading itself is preferably carried out with the grayscale image lines. The smaller resolution can already be originally produced, for example by fewer or larger light reception elements of a respective color. Alternatively, a binning or downsampling on a hardware plane or a software plane is also conceivable to reduce the data to be processed for color image lines subsequently for later steps.

The method in accordance with the invention can be further developed in a similar manner and shows similar advantages in so doing. Such advantageous features are described in an exemplary, but not exclusive manner in the subordinate claims dependent on the independent claims.

Figure 2:
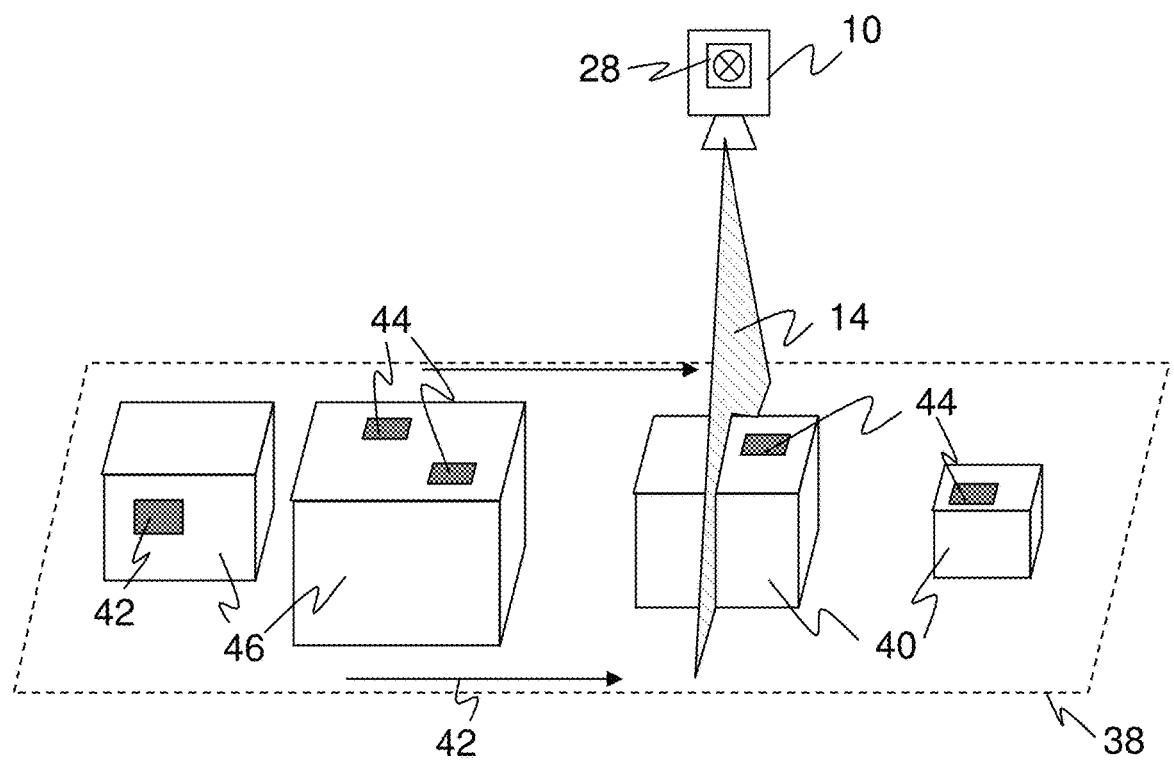
Figure 3:
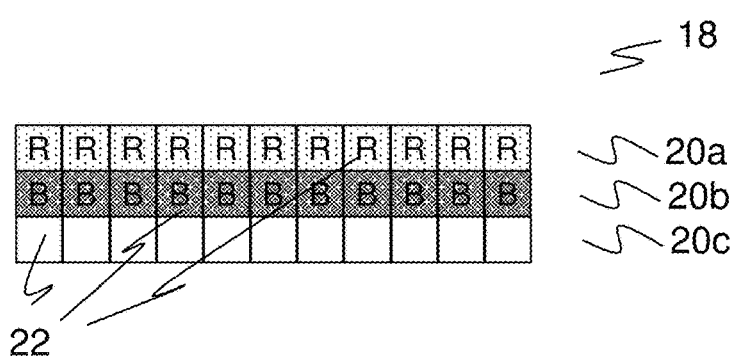

The invention will be explained in more detail in the following also with respect to further features and advantages by way of example with reference to embodiments and to the enclosed drawing. The Figures of the drawing show in:

FIG. 1 a schematic sectional representation of a camera based code reader;

FIG. 2 a three-dimensional view of an application of the code reader in a fixed installation above a conveyor belt having code bearing objects;

FIG. 3 a schematic representation of a linear image sensor having one red, one blue, and one white line.

Figure 4:
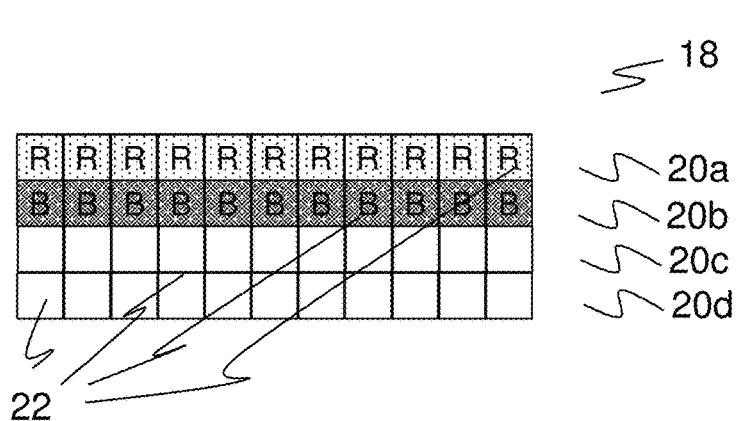
Figure 5:
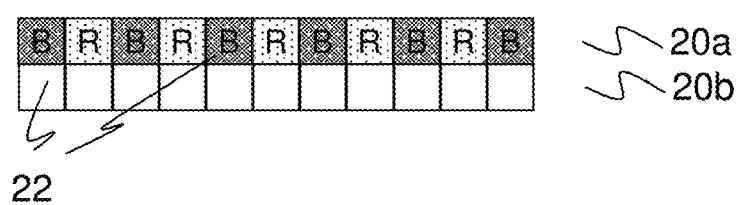
Figure 6:
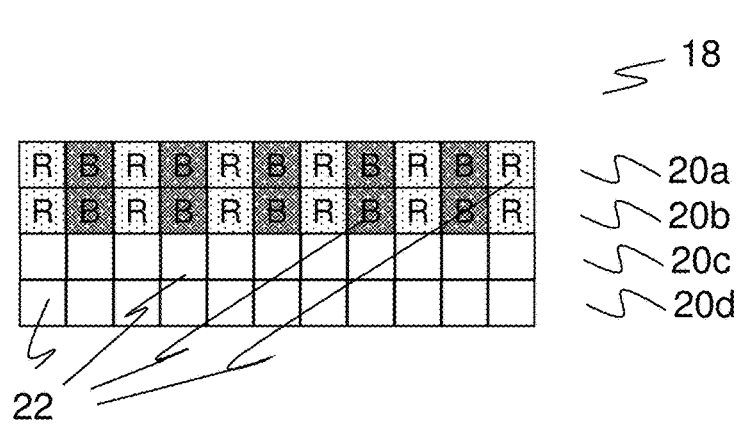
Figure 7:
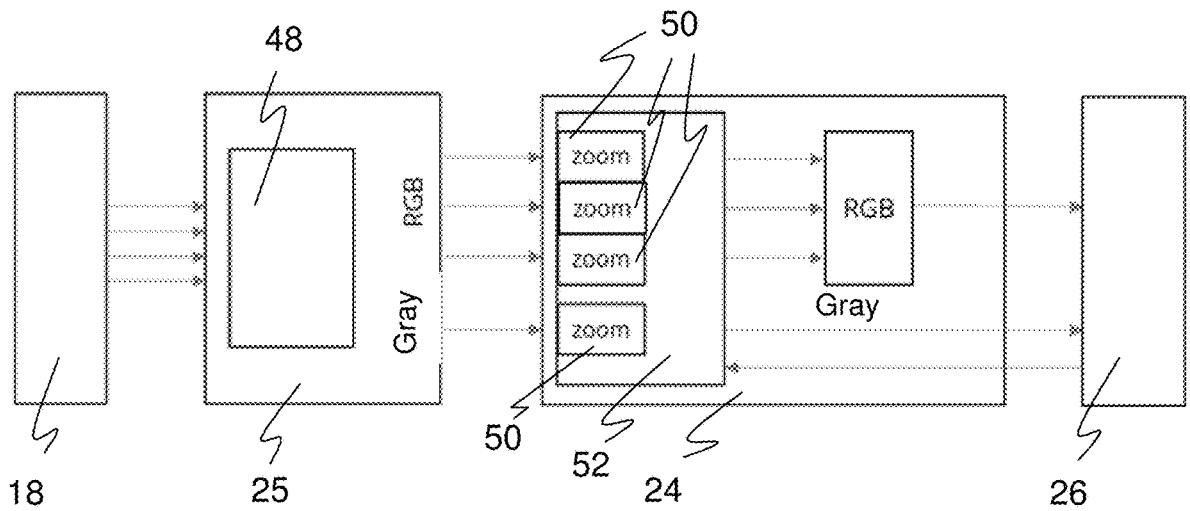
Figure 8:
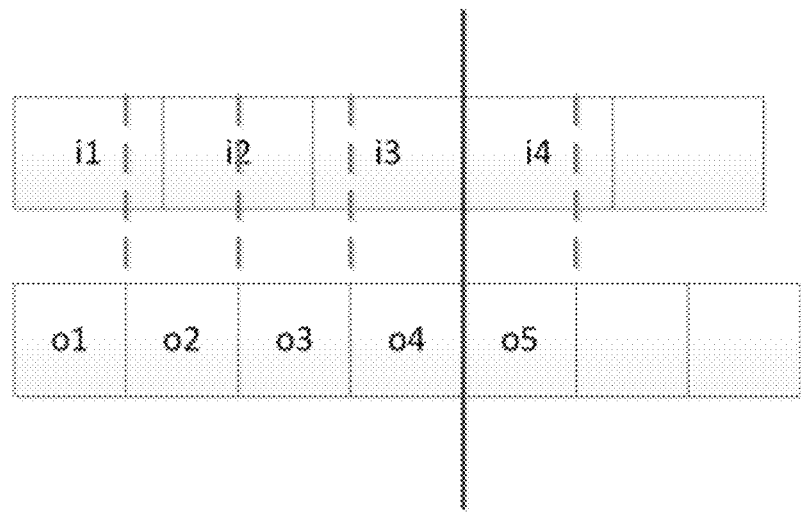
Figure 9:
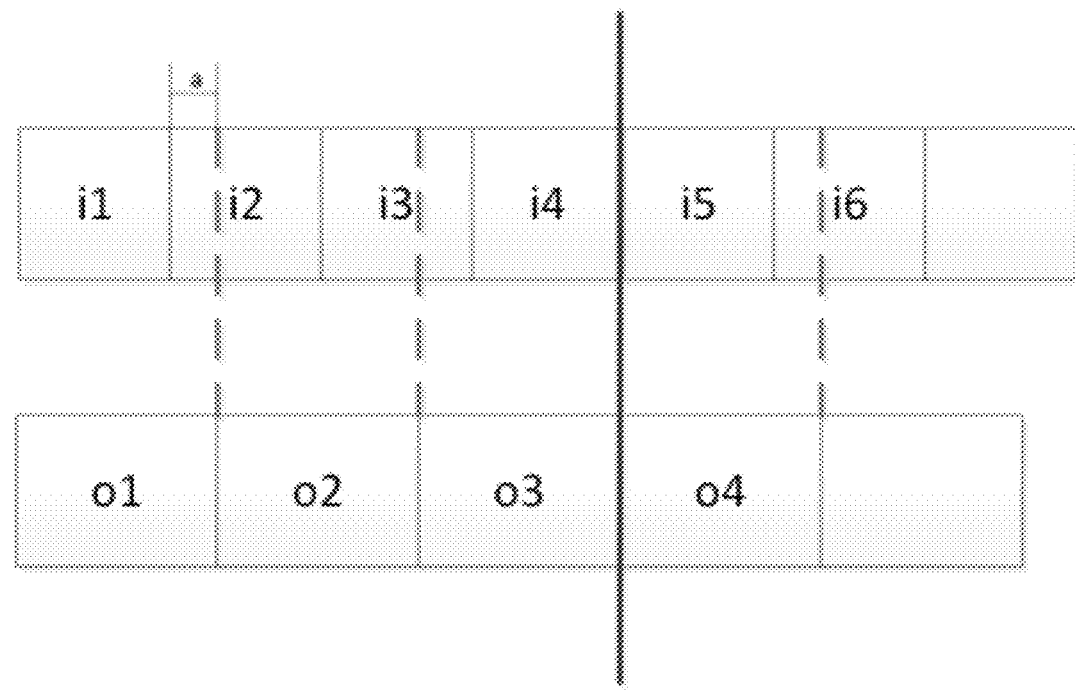

FIG. 4 a schematic representation of a linear image sensor having one red, one blue, and two white lines;

FIG. 5 a schematic representation of a linear image sensor having alternatingly one red blue line, and one white line FIG. 6 a schematic representation of a linear image sensor having two alternatingly red-blue lines and two white lines;

FIG. 7 a schematic representation of a processing pipeline having an image sensor, two pre-processing units, and a further processing unit;

FIG. 8 a representation to illustrate a stretching zoom with a zoom factor $z>1$; and FIG. 9 a representation to illustrate a compressing zoom with a zoom factor $z<1$.

FIG. 1 shows a very simplified block diagram of a camera based code reader 10. The code reader 10 detects received light 12 from a detection zone 14 through a taking objective 16 that is here only represented by a simple lens. A linear image sensor 18 generates image data of the detection zone 14 and of the objects possibly present there. The image sensor 18 has at least two lines 20a-b of light sensitive reception pixels 22, with a plurality of hundreds, thousands, or even more reception pixels 22 being provided in the linear direction.

The image data of the image sensor 18 are read by a control and evaluation unit. The control and evaluation unit is here shown by way of example as a pipeline structure having two pre-processing units 24, 25 and a further processing unit 26. In other embodiments there is only the first pre-processing unit 24 and the second pre-processing unit 25 is missing while in again other embodiments additional pre-processing units may be provided. The pre-processing units 24, 25 preferably have an FPGA (field programmable gate array) and the further processing unit 26 has a microprocessor (CPU, central processing unit). Generally, any desired digital computing modules are considered beside an FPGA and a CPU, that is, for example, a DSP (digital signal processor), a GPU (graphics processing unit), an NPU (neural processing unit), or a TPU (tensor processing unit). The control and evaluation unit can be implemented at least partially in a connected computing unit, for example a computer, a local network, an edge device, or a cloud.

A preferred portion of the evaluation comprises arranging detected image lines next to one another in rows to form an overall image. Otherwise, the image data can be preparatorily filtered, smoothed, brightness normed, tailored to specific zones, or binarized in the evaluation. In accordance with the invention, a digital zoom is provided that will be explained more exactly below with reference to FIGS. 7 to 9. A segmentation furthermore typically takes place in which individual objects or code regions are localized and codes contained therein are decoded, that is the information contained in the codes is read. The division of work between the pre-processing units 24, 25 and the further processing unit 26 preferably provides that data intensive steps that are simple per se are in particular performed by the pre-processing units 24, 25 with the requirement of accessing all the pixels. More complex steps, in particular only still within regions of interest, are then assigned to the further processing unit 26. The pre-processing units 24, 25 can already satisfy their work during the streaming, that is already during the reading and forwarding of image data by the image sensor 18 to the further processing unit 26. Such a processing pipeline or on the fly processing enables a real time processing in which the image data are practically already pre-processed as soon as they are available at al. The digital zoom is in particular a step that can already be carried out by the first pre-processing unit 24 during the streaming.

To illuminate the detection zone 14 sufficiently brightly with transmitted light 28, an illumination device 30 having at least a light source 32 and a transmission optics 34 is provided that can also be external, differing from the representation. Data can be output at an interface 36 of the code reader 10, for example raw image data, pre-processed image data, and other data in different processing stages such as identified objects, read code information, or not yet decoded code image data. It is conversely possible to parameterize the code reader 10 via the interface 36 or via a further interface.

FIG. 2 shows a possible application of the code reader 10 in an installation at a conveyor belt 38 that conveys objects 40 in a conveying direction 42, as indicated by the arrow, through the detection zone 14 of the code reader 10. The objects 40 bear code regions 44 at their outer surfaces. It is the object of the code reader 10 to recognize code regions 44 and to read the codes affixed there, to decode them, and to associate them with the respective associated object 40. In order also to recognize laterally applied code regions 46, a plurality of code readers 10 are preferably used from different perspectives. There can be additional sensors, for example a laser scanner disposed upstream to detect the geometry of the objects 40 or an incremental encoder for detecting the speed of the conveyor belt 38. The code reader 10 can have an integrated distance sensor instead of an upstream laser scanner or as a supplement thereto.

The detection zone 14 of the code reader 10, corresponding to the linear image sensor 18, is a plane having a linear reading field. A total image of the objects 40 conveyed past, together with the code regions 44, arises gradually in that the objects 40 are recorded line-wise in the conveying direction 42. The lines 20*a*-*b* are here so close together that they practically detect the same object section. Alternatively, an offset could also be compensated optically or by calculation.

The image sensor 18 of the code reader 10 detects color image data or a color image. There are consequently a plurality of color channels since a color space can only be represented in a plurality of color components. The color information can be utilized for different purposes. This can include, for example, for a human observer, in addition to a color reproduction, the classification of objects 40, for instance to determine whether it is a parcel, an envelope, or a bag, It can be determined whether a conveyor belt container is empty, such as a tray of a tray conveyor or a box. The segmentation of the image data into objects 40 or code regions 44 can be carried out using or supported by the piece of color information. Additional image recognition work can be done such as the recognition of specific prints or labels, for example for hazardous goods marking, or letters (optical character recognition, OCR).

The image sensor 18 of the code reader 10 additionally detects grayscale image data or a grayscale image or a black and white image, that is it has a grayscale channel to the color channels. In a uniform use of language, this can be understood such that a white color channel is also provided in addition to the actual color channels such as red, green, and blue. In this respect, the representation RGB of a color space is used as representative in the following without thereby excluding other representations of which a plurality have been named by way of example in the introduction.

FIGS. 3 to 6 show some examples of embodiments of the linear image sensor 18 for a common detection of black and white images and color information. It is common to these embodiments that at least one of the lines 20*a*-*d* is a white line whose reception pixels 22 detect light over the total spectrum within the limits of the hardware. At least one further line 20*a*-*d* is a color line whose reception pixels 22 are only sensitive to a specific color, in particular by corresponding color filters. The distribution of the colors over the respective reception pixels 22 of the color lines differs in dependence on the embodiment, but differs in the embodiments shown from also possible, but not shown, typical RGB and in particular from a Bayer pattern. Differing from the shown embodiments, white and color pixels could also occur in mixed form in a line, but if there is not at least one line only with white pixels, a lower resolution of the grayscale image lines that are particularly important for the code reading results therefrom.

FIG. 3 shows an embodiment respectively having a red line 20*a*, a blue line 20*b*, and a white line 20*c*. The lines 20*a*-*c* are therefore homogeneous in themselves and the reception pixels 22 within a line 20*a*-*c* are sensitive to the same optical spectrum. FIG. 4 shows a variant having an additional white line 20*d*.

In the embodiment in accordance with FIG. 5, reception pixels 22 sensitive to red and to blue are alternatingly mixed within a color line 20*a*. A design having a total of only two lines is thereby possible in combination with one white line 20*b*. FIG. 6*b* shows a variant in which both the color lines 20*a*-*b* and the white line 20*c*-*d* are doubled.

These examples are only a selection based on the primary colors red and blue with white (RBW). Further embodiments use different color filters and colors. The use of green with red or blue (RGW, BGW) or all three primary colors (RGBW) would thus also be conceivable. The subtractive primary colors cyan, magenta, and yellow can furthermore also be considered in analog combinations (CMW, CYW, MYW, or CMYW).

In the embodiments of FIGS. 3 to 6, only image data in the two primary colors red and blue are initially recorded. If a representation of the color in RGB values is desired, the missing color green can be at least approximately reconstructed by G=W−R−B or generally by a function f(W, R, B). The reconstruction is analogous for a different missing color. After such a reconstruction or in a step with the reconstruction, a color adaptation preferably takes place in which the recorded colors are corrected into desired colors. A matrix can be stored for this purpose that weights the different color channels and the grayscale channel or a lookup table is given that associates a desired color with the respective recorded color. The object of the lookup table can also be taken over by a neural network. A color adaptation is also possible when the image sensor 18 records all the primary colors and no primary color is reconstructed.

FIG. 7 shows a schematic representation of a processing pipeline of the control and evaluation unit in an embodiment with the first pre-processing unit 24, the second pre-processing unit 25, and the further processing unit 26. The first pre-processing unit 34 bears this name because it is responsible for the digital zoom. It is, however, preferably the second pre-processing unit 25 that is directly connected to the image sensor 18 and thus forms the start of the processing pipeline; the first pre-processing unit 24 and the further processing unit 26 follow. In other embodiments, there is only the first pre-processing unit 24. Both pre-processing units 24, 25 are pre-processing units implemented on a respective FPGA.

The image sensor 18 records a respective image line and presents the image information in at least one grayscale channel and two color channels. White, red, and blue are used as a representative example in the following. Accordingly, in the example, a green color channel has to be reconstructed if complete RGB colors are to be output. Alternatively, the image sensor 18 already records a green image line, possibly imitating a Bayer pattern even two green image lines, so that there is already originally a green color channel. The explanations with the colors named by way of example can be transferred to other image sensors 18 and/or representations of the color space.

The image information in the grayscale channel and in the original color channels are transferred to the second pre-processing unit 25 or are read or streamed from it. A color calculation unit 48 of the second pre-processing unit 25 reconstructs the missing color channel and/or adapts the colors as described above. The image information is then forwarded to the first pre-processing unit 24 in the grayscale channel and the color channels that have had the reconstructed color channel added. If no color is to be reconstructed and if no color adaptation takes place, the second pre-processing unit 25 can be dispensed with. Its functionality could furthermore also be co-implemented on the first pre-processing unit 24.

The first pre-processing unit 24 has a plurality of processing channels 50, preferably at least one processing channel 50 each for the grayscale channel and each of the color channels, including a possible reconstructed color channel.

The processing channels 50 in each case provide the digital zoom to be described immediately in parallel for the grayscale channel or color channel associated with them. This is coordinated by a common zoom controller 52 that ensures that the synchronicity remains ensured and all the channels are zoomed or scaled in a uniform manner. The parallel processing channels 50 make it possible to process the large data quantities of the image sensor 18 in real time.

The more the processing is parallelized, the lower the cycle frequency can in particular be selected in an FPGA and thus the dynamic power loss can be reduced and the positioning and wiring in the FPGA can be simplified. The rescaled color image lines are preferably combined and transmitted, in the same way as the rescaled grayscale image line, to the further processing unit 26 or to a memory they can access.

To achieve an even higher degree of parallelization, the image lines in all the channels can be divided in the middle and a half line can then be mirrored. The half lines are then in turn processed in parallel with one another, for which purpose the processing channel 50 can again be doubled. The first pre-processing unit 24 can take over the division and mirroring upstream of the processing channels 50 or at their start, but the second processing unit 25 can also take them over. The zoom algorithm can thus zoom or rescale the respective channels in parallel and synchronously from the middle. A zoom from the middle can alternatively also be sensible when the half lines are processed consecutively instead of in parallel with one another. For this inter alia also ensures that the rescaled lines are always centered.

The matching zoom factor is preferably redetermined line-wise. The basis for this can be a piece of distance information that an internal distance sensor of the code reader 10 or an external sensor measures, for example an upstream laser scanner. The further processing unit 26 controls the distance measurement or is in communication with a corresponding internal or external processing unit. The first pre-processing unit 24, the further processing unit 26, and/or a different module can be responsible for the determination of the zoom factor z from a piece of distance information. Accordingly, a distance value or a zoom factor z is communicated to the first pre-processing unit 24. Different zoom factors z per processing channel 50 are furthermore conceivable, in particular when the original resolution in the grayscale channel and in the color channels is not identical.

FIG. 8 shows a representation to illustrate a stretching zoom in with a zoom factor z>1. In this respect, an input line is shown before the zoom at the top and an output line after the zoom is shown thereunder. The perpendicular dash symbolizes the preferably carried out division into half lines. In the example, $z=4/3=:b$ and $a:=1/z=3/4$. In an illustrative manner, the input line is stretched by the zoom factor for a linear rescaling (interpolation, extrapolation) and is then discretized to the original pixel grid observed in the output line. In this respect, the pixels of the output line are not flush with both pixel transitions of the input line due to $z \neq 1$. A pixel of the output line takes over the value of the pixel of the input line disposed adjacent to or above it with a weighting corresponding to the degree of overlap. Specific calculation rules are given in FIG. 8 that can be analogously expanded to any desired number of pixels. Since the line width no longer corresponds to the original line width after the zoom in, the rescaled image line is preferably cut to the right and to the left to the original line width.

FIG. 9 shows a representation to illustrate a compressing zoom or a zoom out with a zoom factor z<1. The actual reciprocal of the example of FIG. 8 is selected here for the illustration with $z=3/4=:b$. Furthermore now let $a:=(1-\!/1/z))=1/3$. Apart from the fact that compression now takes place instead of a stretching and the calculation rules given in FIG. 9 adapt somewhat to one another, reference can be made to the explanations on FIG. 8. After the zoom out, the line width has become smaller and the missing pixels are preferably filled up by a defined value such as zero.

The condition $0.5 \leq z \leq 2$ is preferably set in the calculation rules specifically given by FIGS. 8 and 9. The procedure can, however, be expanded analogously to a linear rescaling by other values of the zoom factor z.

The invention claimed is:

1. A camera based code reader for reading an optical code on an object in a relative movement to the code reader, wherein the code reader has a linear image sensor to record a respective image line and a control and evaluation unit with at least one first pre-processing unit and a further processing unit; wherein the first pre-processing unit is connected at least indirectly to the image sensor and is configured to read image line by image line in the course of the relative movement, to rescale a respective image line with a zoom factor z in a pre-processing, and then to forward it to the further processing unit; and wherein the further processing unit is configured to read the optical code from the image lines,
- wherein the image sensor has a plurality of linear arrangements of light reception elements; wherein some of the light reception elements are sensitive to white light and some other respective light reception elements are sensitive to light of respectively only one color and thus a grayscale channel is formed to record grayscale image lines and a plurality of color channels are formed to record color image lines; and
- wherein the first processing unit has a plurality of parallel processing channels, at least one processing channel for the grayscale channel, and at least one processing channel per color channel to respectively rescale a grayscale image line and associated color image lines in parallel and synchronously.

2. The code reader in accordance with claim 1, that has a distance sensor, and wherein the control and evaluation unit is configured to determine the zoom factor z from a distance value of the distance sensor.

3. The code reader in accordance with claim 2, wherein the control and evaluation unit is configured to determine the zoom factor z from a distance value of the distance sensor image line by image line.

4. The code reader in accordance with claim 1, wherein the zoom factor z is different in the processing channels.

5. The code reader in accordance with claim 1, wherein the control and evaluation unit is configured to divide image lines in the middle in each case and to mirror one of the half lines produced; and wherein the processing channels are configured to rescale both half lines of an image line in parallel.

6. The code reader in accordance with claim 1, wherein the processing channels are configured to rescale an image line by linear interpolation or extrapolation with the zoom factor z, with the stretched or compressed pixels contributing to the new pixel in proportion with their surface portion overlapping the new pixel at transitions of the pixel grid.

7. The code reader in accordance with claim 6, wherein the processing channels are configured to rescale an image line by linear interpolation or extrapolation with the zoom factor z in that the recorded image line is stretched or compressed by the zoom factor z and the stretched or compressed image line is discretized to the original pixel grid again.

8. The code reader in accordance with claim 1, wherein the first pre-processing unit has a common zoom controller for all the processing channels.

9. The code reader in accordance with claim 1, wherein the first processing unit has an FPGA and/or the further processing unit has a microprocessor.

10. The code reader in accordance with claim 1, wherein the control and evaluation unit has a second pre-processing unit that is arranged between the image sensor and the first pre-processing unit and that is configured to carry out a color adaptation of the image lines recorded with the color channels and/or to generate at least one further color channel from the grayscale channel and the color channels.

11. The code reader in accordance with claim 10, wherein the second pre-processing unit is an FPGA.

12. The code reader in accordance with claim 1, wherein a grayscale image from image lines of the grayscale channel is used to read codes.

13. The code reader in accordance with claim 1, wherein a color image from image lines of the color channels is used to recognize and to classify code bearing objects and/or code regions and/or to distinguish them from the image background.

14. The code reader in accordance with claim 1, wherein two, three, or four linear arrangements are provided and at least one linear arrangement only has light reception elements that are sensitive to white light.

15. The code reader in accordance with claim 1, wherein the image sensor has light reception elements that are respectively sensitive to one of two primary colors, but has no light reception elements that are sensitive to the third primary color.

16. The code reader in accordance with claim 15, wherein the image sensor has light reception elements that are respectively sensitive to red and blue, but has no light reception elements that are sensitive to green.

17. A method of reading an optical code on an object using a camera based code reader in a relative movement to the object, wherein the object is recorded image line by image line by a linear image sensor of the code reader and first pre-processing unit reads a respective image line, rescales it with a zoom factor z, and then forwards it to a further processing unit that reads the optical code from the rescaled image lines, wherein the image sensor has a plurality of linear arrangements of light reception elements; wherein some of the light reception elements are sensitive to white light and some other respective light reception elements are sensitive to light of respectively only one color and thus a grayscale channel by which a grayscale image line is recorded, and a plurality of color channels are formed by which a respective image line is recorded; and wherein the first processing unit respectively rescales a grayscale image line and associated color image lines in parallel and synchronously in a plurality of parallel processing channels, at least one processing channel for the grayscale channel and at least one processing channel per color channel.

18. The method in accordance with claim 17, wherein the camera based code reader has a linear image sensor to record a respective image line and a control and evaluation unit with at least one first pre-processing unit and a further processing unit; wherein the first pre-processing unit is connected at least indirectly to the image sensor and is configured to read image line by image line in the course of the relative movement, to rescale a respective image line with a zoom factor z in a pre-processing, and then to forward it to the further processing unit; and wherein the further processing unit is configured to read the optical code from the image lines, wherein the image sensor has a plurality of linear arrangements of light reception elements; wherein some of the light reception elements are sensitive to white light and some other respective light reception elements are sensitive to light of respectively only one color and thus a grayscale channel is formed to record grayscale image lines and a plurality of color channels are formed to record color image lines; and wherein the first processing unit has a plurality of parallel processing channels, at least one processing channel for the grayscale channel, and at least one processing channel per color channel to respectively rescale a grayscale image line and associated color image lines in parallel and synchronously.

* * * * *